March 14, 1961 B. SEEWACK 2,974,806
SHOWER ROD HOLDER
Filed June 27, 1957
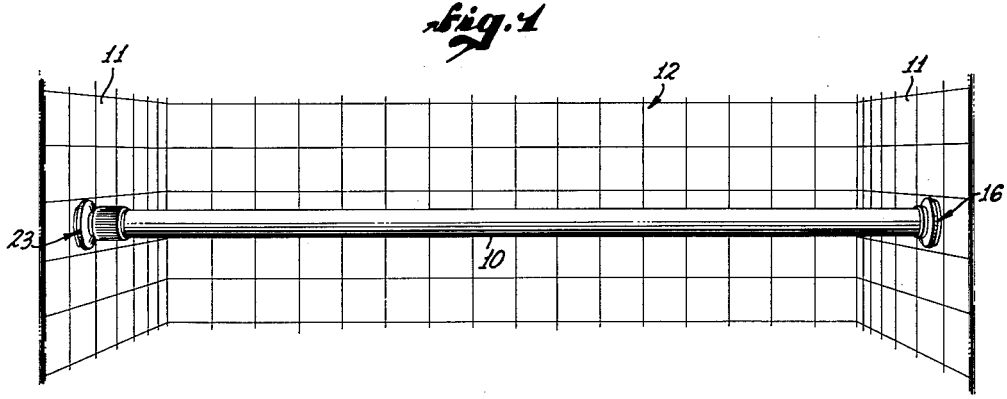
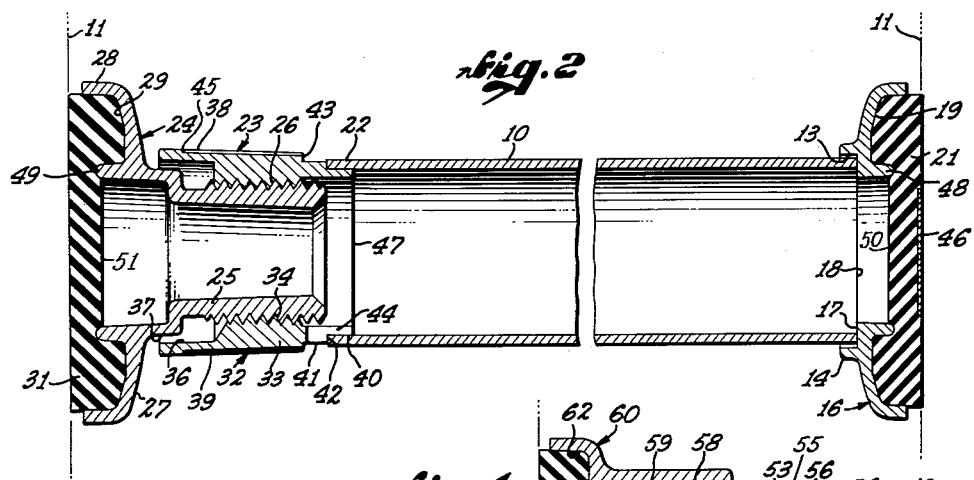
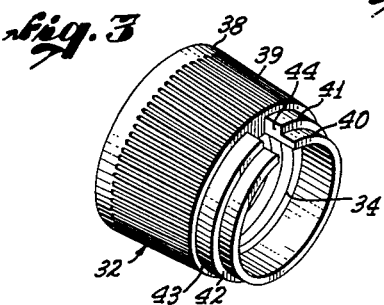
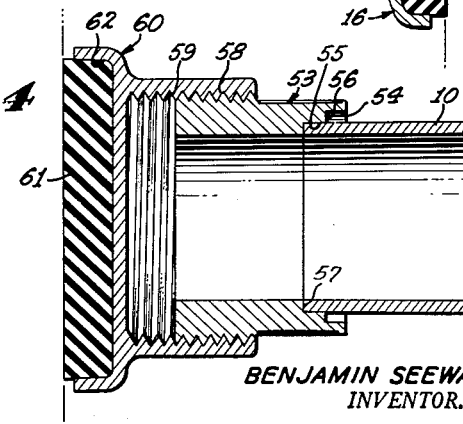
BENJAMIN SEEWACK,
INVENTOR.
HERZIG & JESSUP,
BY ATTORNEYS.

United States Patent Office 2,974,806
Patented Mar. 14, 1961

2,974,806

SHOWER ROD HOLDER

Benjamin Seewack, 2857 E. 11th St.,
Los Angeles 23, Calif.

Filed June 27, 1957, Ser. No. 668,550

1 Claim. (Cl. 211—123)

This invention relates to an adjustable bracket for a rod, and more specifically to a means for installing a rod, tube or the like, securely between two rigid walls without drilling or marring the walls.

An object of this invention is to provide a new and improved adjustable bracket which is capable of securely mounting a rod between two rigid walls including new and improved adhesive means for one or both sides of each bracket for securing the same temporarily to a wall or walls.

It is another object of this invention to provide a new and improved adjustable bracket which mounts the rod between the walls without the necessity of drilling the walls or of using nails or screws to mount same.

A further object of this invention is to provide a new and improved adjustable bracket which is easily and quickly manipulated to mount the rod.

A still further object of this invention is to provide a new and improved adjustable bracket of the character described which can be used to mount rods of different commonly-used sizes.

Another object of this invention is to provide a new and improved adjustable bracket which can be used to mount variously constructed tubular rods such as seamless tubing, or locked-seamed tubing.

It is another object of this invention to provide a new and improved adjustable bracket which is economical to manufacture and capable of interchangeability of parts thereof.

It is a general object of this invention to provide an adjustable bracket of the character described, which overcomes disadvantages of prior devices and methods heretofore intended to accomplish generally similar purposes.

These and other objects of this invention will be apparent from the following description of the drawings and appended claim.

In the drawings:

Figure 1 is a perspective view, in elevation, of a preferred form of this invention, shown installed as in a bathroom or the like;

Figure 2 is an enlarged vertical sectional view of the device shown in Figure 1;

Figure 3 is an enlarged perspective view in elevation of the rotatable member incorporated in this invention; and Figure 4 is an enlarged sectional view showing another embodiment of this invention.

Referring to the drawings, and more particularly to Figures 1–3, there is shown by way of illustration, but not of limitation, a rod 10 mounted between end walls 11 of a bathroom or shower stall 12. The rod 10 may be formed of any suitable rigid material, such as wood, metal, thermo-set plastics, or the like, and is illustrated herein as a metal tube, which may be seamless or of a locked-seam construction, as desired.

One end of the tubular rod 10 is supported in a recess 13, optionally stepped, formed by an annular ridge 14 of a socket member 16. A shoulder 17 is preferably formed at the base of the recess for abutment with the outer end 18 of the tube 10. The inner diametrical dimension of the recess 13 is preferably large enough to accommodate the outer diameter of the larger of the most commonly used size of tubing 10. The shoulder 17 is preferably wide enough or a solid web may be provided to support the smallest inner diametrical dimension of the size tube more commonly used for such purposes, to prevent the tube from extending through the socket 16. An outwardly facing recess 19 is provided in the socket 16 to receive a resilient pad 21 of rubber, neoprene or the like, forming a wall gripping means.

The other end 22 of the rod 10 is supported by the adjustable bracket generally indicated by the numeral 23. The bracket 23 comprises a stud member 24 which includes an inwardly extending hollow boss 25 having external threads 26 thereon. The bracket further includes an enlarged base 27 having an outwardly extending annular flange 28 to form an outwardly facing recess 29 therein. A resilient pad 31 conforming in configuration to the recess 29 is accommodated within the recess, forming a gripping means for the other wall. The stud member 24 is preferably made by die casting, and the boss is made hollow to facilitate casting and to economize on material.

A rotatable member 32 is provided to clampingly engage the rod 10 in position between the socket member 16 and the adjustable bracket member 24. The rotatable member 32 comprises a tubular body 33, internally threaded as at 34 to correspond to and engage the threads 26 of the stud 25. An enlarged bore 36 is preferably provided at the outer end of the member 32 to clear an unthreaded portion 37 of the boss 25. The outer end of the rotatable member 32 is extended to provide a skirt 45, having a greater internal diameter than the threaded portion 34, and extending, beyond the threaded portion 26 and in spaced relation to the smooth unthreaded portion 37, to a position adjacent the enlarged outer end 27 of the stud member 24. The skirt 45 thereby forms a protective shield, preventing the water spray from rusting the threads 26 and 34. The wall of the bore 36 is tapered, and therefore any water that may enter into the bore is quickly drained, and cannot collect to cause rusting of the parts. The outer cylindrical, or other, surface 38 of the member 32 is preferably serrated or knurled as at 39 to provide a gripping surface and thereby facilitate manual rotation thereof. The outer surface of the inner end of the member 32 is progressively reduced or stepped to provide an annular surface 40, and an annular surface 41 to support an end of the tube 10, as previously mentioned. Shoulders 42 and 43, formed by the annular surfaces 40, 41, respectively, form abutments for the outer edge of the tube end 22.

As best seen in Figure 2, the tube 10 of the smaller of the commonly used tube sizes, such as 15/16 of an inch outer diameter, telescopes over the surface 40 and abuts against the shoulder 42. The larger of the commonly used tube sizes such as 1 inch O.D., may be supported as on the surface 41, abutting against the shoulder 43, to support such a tube. A notch 44, see Figures 2 and 3, is preferably provided at the inner end of the member 32 extending through the annular surfaces 40 and 41 and terminating as at the shoulder 43, to accommodate the normally internally-placed seam of a locked-seam tube, if so used.

To install the rod 10 between the walls 11, the socket member 16 is first positioned on one of the walls in a desired position. If desired, a thin wafer-like disc 46, of paper or the like, is preferably provided with adhesive material on both sides thereof, to assist in temporarily holding the socket member 16 in place. The disc 46 is placed against the wall 11 in a desired position, to adhere thereon. The socket member 16 is then pressed over the disc 46, to be held in place, on the wall by the disc 46. The resilient member 21 is preferably snugly fitted into the recess 19 of the member 16 so the parts will not separate.

The member 23 is then manually held against the opposite wall 11 with the rotatable member 32 backed off of the boss 25 and provides a maximum distance between the socket member 16 and the bracket member 23. The tube 10, cut to a length approximating the distance between the shoulder 17 of the member 16 and the outer edge 47 of the rotatable member 32 is inserted into the recess 13 and aligned with the rotatable member. The rotatable member 32 is then rotated to extend the member inwardly and engage the tubing 10, until either the surfaces 40, 41 engages the outer end of the tube, depending on which size of tube is used. The rotatable member 32 is then further rotated until the rod 10 is firmly and securely clamped between a shoulder 42 or 43 and the shoulder 17, and the resilient members 21, 31, are compressed to frictionally engage the walls 11.

The socket member 16 and stud member 24 are preferably provided with outwardly extending flanges 48, 49, fitting within recesses 50, 51, respectively, to transmit a circular compressive force to the resilient pads 21, 31, respectively.

Referring to Figure 4, there is shown another embodiment of this invention, wherein like parts are referred to by like numbers.

In this instant embodiment, a rotatable member 53 is provided with internally stepped annular surfaces 54, 55, forming abutment shoulders 56, 57, respectively, to support the tube 10.

The member 53 further includes external threads 58 to engage internal threads 59 of a base member 60. A resilient pad 61 similar to the pads 21 or 31, is provided within a recess 62 formed in the base.

In this form, the member 53 is backed into the base member 60, similarly as the rotatable member 32 of the previously described embodiment, to allow insertion of the tube 10 between the member 16 and the member 53. The rotatable member 53 is then rotated to extend the shoulder 56 or 57 into abutment with the tube 10 and clamp the tube in position as previously described.

In this embodiment, no provision, such as the notch 44, is necessary for the seam of a locked-seam tube, as such seam is usually formed on the interior of the tube.

While I have herein shown and described what I conceived to be the most desired embodiments of my invention, it is to be understood that alterations and modifications thereof may be made in a manner to satisfy the spirit of my invention which is intended to comprehend any and all equivalent devices as comprehended in the following claim which are to be given the greatest breadth consistent with the prior art.

What I claim is:

An adjustable rod holder for supporting a rigid rod between two walls comprising a tubular rod, a socket means for supporting one end of the rod, said socket means having an inwardly facing recess adapted to receive said rod end and having an outwardly facing recess, a resilient gripping means residing in said outwardly facing recess for frictionally gripping a wall, adjustable bracket means for supporting the other end of the rod and comprising a stud member having a cylindrical portion, said cylindrical portion having threads on its outer surface, a hollow rotatable fitting having screw threads on its inner surface cooperating with the threads on the stud, the said stud member having an enlarged outer end for frictionally engaging a wall, said enlarged outer end being spaced from the threaded portion to provide an unthreaded portion therebetween, said rotatable fitting having a portion forming a skirt having a greater internal diameter than the threaded portion thereof to extend over the unthreaded portion of the stud member, said rotatable fitting having a plurality of concentric outer surfaces, having different diameters for receiving and holding the ends of tubular rods of different diameters.

References Cited in the file of this patent

UNITED STATES PATENTS

| | | |
|---|---|---|
| 2,146,859 | Seklehner | Feb. 14, 1939 |
| 2,199,851 | Culver | May 7, 1940 |
| 2,557,434 | Hovarder | June 19, 1951 |
| 2,594,605 | Zoppelt | Apr. 29, 1952 |
| 2,780,365 | Trainor | Feb. 5, 1957 |
| 2,857,176 | McTaggart | Oct. 21, 1958 |

FOREIGN PATENTS

| | | |
|---|---|---|
| 319,128 | Great Britain | Sept. 19, 1929 |